(12) United States Patent
Drake et al.

(10) Patent No.: US 11,671,263 B2
(45) Date of Patent: Jun. 6, 2023

(54) CRYPTOGRAPHICALLY SECURING DATA FILES IN A COLLABORATIVE ENVIRONMENT

(71) Applicant: T-Mobile USA, Inc., Bellevue, WA (US)

(72) Inventors: Aaron Drake, Sammamish, WA (US); Lee Miller London, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 220 days.

(21) Appl. No.: 16/557,542

(22) Filed: Aug. 30, 2019

(65) Prior Publication Data

US 2021/0067344 A1 Mar. 4, 2021

(51) Int. Cl.
*H04L 29/06* (2006.01)
*H04L 9/32* (2006.01)
*H04L 9/00* (2022.01)
*H04L 9/06* (2006.01)

(52) U.S. Cl.
CPC ............ *H04L 9/3247* (2013.01); *H04L 9/006* (2013.01); *H04L 9/0643* (2013.01); *H04L 9/50* (2022.05)

(58) Field of Classification Search
CPC ..... H04L 9/3247; H04L 9/006; H04L 9/0643; H04L 2209/38
See application file for complete search history.

(56) References Cited

U.S. PATENT DOCUMENTS

| | | |
|---|---|---|
| 9,720,925 B1 | 8/2017 | Lawson |
| 10,339,299 B1 | 7/2019 | Magnuson et al. |
| 2006/0116966 A1 | 6/2006 | Pedersen et al. |
| 2016/0202972 A1 | 7/2016 | Sass et al. |
| 2017/0046698 A1* | 2/2017 | Haldenby ........... G06Q 20/4016 |
| 2018/0191503 A1* | 7/2018 | Alwar ................... H04L 9/0637 |
| 2018/0285970 A1* | 10/2018 | Snow .................... H04L 9/3247 |

(Continued)

OTHER PUBLICATIONS

"How do I properly credit an original code's developer for her open source contribution?", downloaded from https://www.quora.com/How-do-I-properly-credit-an-original-codes-developer-for-her-open-source-contribution dated Mar. 29, 2014 and attached as PDF file. (Year: 2014).

(Continued)

*Primary Examiner* — Beemnet W Dada
*Assistant Examiner* — Leynna Truvan
(74) *Attorney, Agent, or Firm* — Han Santos, PLLC (57) ABSTRACT

This disclosure describes techniques for implementing blockchain for document verification and tracking. The techniques include parsing at least one portion of a version of a data file based at least on one or more parsing parameters, wherein at least one portion is associated with a transaction. The techniques also include generating a hash value for at least one portion associated with the transaction from a hash function and generating a digital signature using the hash value and key. Blocks representing the transaction is inserted onto a blockchain distributed ledger. The techniques further include receiving an updated version of the data file comprising the at least one portion of the data file associated with a new transaction and inserting additional blocks onto the blockchain distributed ledger recording the new transaction. Thereafter, the techniques include indicating differences between the version and the updated version of the data file.

14 Claims, 6 Drawing Sheets

(56) References Cited

U.S. PATENT DOCUMENTS

| | | |
|---|---|---|
| 2018/0329693 A1 | 11/2018 | Eksten et al. |
| 2019/0065709 A1 | 2/2019 | Salomon |
| 2020/0186361 A1* | 6/2020 | Almgren .................. H04L 9/30 |
| 2020/0287874 A1 | 9/2020 | Bertram et al. |

OTHER PUBLICATIONS

U.S. Appl. No. 16/557,640, Office Action dated Dec. 17, 2021, 54 pages.
U.S. Appl. No. 16/557,640, Final Office Action dated Jul. 1, 2022, 57 pages.
Luo et al. ("Ariadne: An Eclipse-based system for tracking the originality of source code", IBM Systems Journal, vol. 46, No. 2, 2007) (Year: 2007).
U.S. Appl. No. 16/557,640, Notice of Allowance dated Oct. 20, 2022, 35 pages.

* cited by examiner

CRYPTOGRAPHICALLY SECURING DATA FILES IN A COLLABORATIVE ENVIRONMENT

BACKGROUND

Various electronic authentication methods are used to authenticate and confirm the integrity of documents and their signers. Most of these methods utilize a digital signature that comprises some form of asymmetric cryptography. One common data-signing method relies on some form of the Public Key Infrastructure (PKI). Digital signatures typically require creating a unique identifier used for sender verification purposes in order to emulate the signature systems available in the paper-based transaction world. One level of authentication stems from the unique digital signature itself. Similar to a manually signed signature, a digital signature is unique to the sender, and therefore shows that the sender has authored or read the document and affixed his or her signature to indicate his or her approval of its contents.

Another level provides a notary function similar to that in the paper world by requiring that the document be encrypted with the sender's private key. Finally, the digital signature provides a means of preventing unauthorized alterations of the document by incorporating a message integrity code (MIC) computed to yield a "checksum" quantity unique to the particular combination of letters and spaces in the message at the time sent. In short, a digital signature scheme is an authentication mechanism that allows the recipient of a message to forward it to a third party and prove irrefutably that the document has not been manipulated since its author sent it. While the authentication and privacy enhancement afforded by digital signature can ensure that the document as a whole has not been manipulated, individual portions of multiple versions of the document bound to a specific transaction and individual authors in collaboration and research setting may not be tracked and verifiable by all users.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques for implementing blockchain for verifying and tracking the integrity of individual portions of a data file. In various embodiments, one or more client devices can comprise peer computing nodes that store at least a portion of a blockchain distributed ledger. The client devices comprise a file editor application for viewing and creating data files in various format. The file editor application can comprise a kit that includes one or more of a text document editor, an image editor, a photo editor, a Portable Data File (PDF) editor software, etc.

In various embodiments, public key cryptography can be applied, whereby public key cryptography signing algorithms can provide key distribution and secrecy (e.g., Diffie-Hellman key exchange, asymmetric key encryption scheme), provide digital signatures (e.g., Digital Signature Algorithm (DSA)), or both (e.g., Rivest-Shamir-Adleman (RSA) algorithm). A private key can be generated locally on a user's client device such that it is private to that user. A public key can be derived from the private key and therefore correspond to the private key.

The public key can be tied to a user's subject identifier (e.g., an email address) in a security certificate issued by a certificate authority. As long as the private key is kept a secret, any signature produced using the private key serves as proof that the signer is the same party that originally published the public key. In addition to PKI, Authentication and Key Agreement (AKA) scheme, and/or other authentication protocol such as multi-factor authentication and Shared Access Signature (SAS) certification can be implemented, depending upon embodiments.

Public keys can be recorded in a public ledger of ownership rights. Digital assets can be associated with these public keys such that the public keys serve as the digital representation of the owner of the assets. A transfer of ownership of a digital asset from one public key to another can be signed with the corresponding secret private key of the sender to prove the authenticity and the integrity of the message. Thus, any record keeping entity tasked with recording changes and transfers to the ledger would have no way to forge such transfer if it was not initiated and signed by the sender. In this way, the signature also ensures that no data in the message is manipulated.

Blockchains can be implemented to improve the integrity of documents and the verification of the identity of their authors by maintaining a public record of series of transactions made by one or more authors of the text file and subsequent recipients of the text file. Signed transactions can be grouped into blocks that can be propagated to the whole network before subsequent blocks of transactions are produced. Each block references and builds off a previous block using cryptographic hash functions (e.g., Message Digest (MD)-5, Secure Hash Algorithms (SHA)-1, SHA-2, or SHA-256) of a private key held by a user. Further, a public key, which may be distributed to one or more parties of the distributed ledger, may be used to authenticate that the holder of the private key used in the hash function is indeed the same user, therefore verifying identity of the user in the system. A hash function takes arbitrary digital data as input and returns a digest, a hash value, or a fixed length pseudo-random number as output. This hash function value generally falls within a very restrictive range set by a predefined protocol. Tying each block to its previous block with these hash functions in a consecutive order generates a chain, thereby creating a blockchain (i.e., a ledger), containing all accepted transactions. A blockchain thus forms a public record of all transactions.

In some aspects, a user can create and edit a data file such as a text file using the text editor component of the file editor application. The data file is signed with the user's private key and such transaction is referenced in a blockchain to verify the ownership and the authenticity of the data file. The digital signature software may integrate with cloud storage services to allow the user to save and access data files in any of the user's cloud storage accounts.

A public ledger representing the state of ownership of a text file can be deduced from the full record of transactions in the blockchain beginning with the first block. Because each block contains a cryptographic hash of the immediately previous block or a reference that links it to the immediately previous block, the transaction cannot be reversed. If any data is changed or missing, the calculated hash values would also change for all blocks from that point forward. The changed hash values would no longer fall within the range required by the predefined protocol, and the chain would be invalid. In this way, a text file cannot be manipulated or altered without affecting the blockchain. Various cryptographic time-stamping methods are available and could also be used. As noted above, the user's private key can authenticate the data file to the extent that the private key is not compromised or known to anyone else but the user.

In some aspects, the file editor application comprises a parsing engine that can define at least one portion of a data file based at least on one or more parsing parameters. For example, upon creation of a new text file, the parsing engine can read lines from the text file and extract information, patterns, from each line to parse the text file into one or more portions. A portion of the text file can comprise a body of text (e.g., a paragraph, a sentence, etc.) that is associated with an identity of a single author, and the author's private key algorithm is applied to the digest or the hashed value of the portion of the text file. If the data file has multiple authors in a collaborative scenario, one portion of the text file comprising a first body of text can be associated with an identity of a first author, and the first author's private key algorithm is applied to the hashed value of the first body of the text. Similarly, another portion of the same text file comprising a second body of text can be associated with an identity of a second author, and the second author's private key algorithm is applied to the hash value of the second body of the text. The individual transactions associated with respective portions of the text file can correspond a block in a blockchain, and as the data file is modified by one or more authors, the chain becomes longer.

Additionally, the file editor application is configured to receive a request for the provenance of a file and present the various ownership and contribution data within the file or within the meta-information of the file. In this way, the individual portions of multiple versions of the file bound to a specific transaction and individual authors in a collaboration setting may be tracked and verifiable by all users. The techniques described herein may be implemented in a number of ways. Example implementations are provided below with reference to the following figures.

Example Architecture

Figure 1:
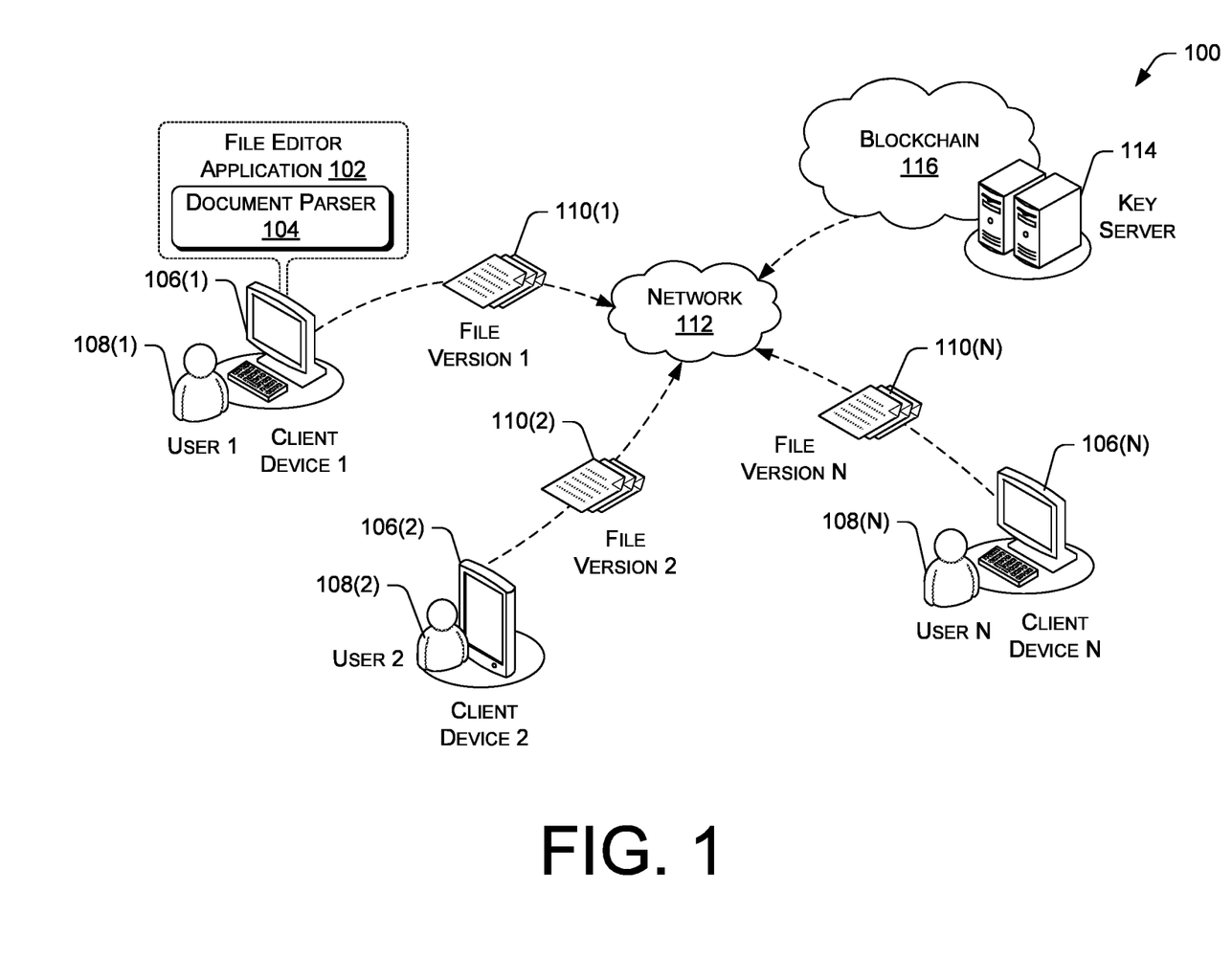
FIG. 1 illustrates example system architecture for tracking multiple versions of a data file created from multiple client devices.

FIG. 1 illustrates example architecture for tracking multiple versions of a data file created from multiple client devices, in accordance with some embodiments. The architecture 100 includes a system that implements a distributed ledger such as a blockchain 116 or any other data storage structure. Blockchains are secure by design and exemplify a distributed computing system with high Byzantine fault tolerance. The blockchain 116 may include a plurality of blocks. Each block is identified with a cryptographic hash of its content, wherein the content can comprise a plurality of transactions related to data files 110(1)-110(N). Except for the first block, each block contains a reference to the previous block in the chain. The reference is the cryptographic hash of the content of the previous block. In various embodiments, the plurality of transactions can be ordered chronologically, such that each newly added block may be linked to a most recent block.

The blockchain 116 is shared among multiple computing nodes such as client devices 106(1)-106(N) or servers in communication with a network 112 (e.g., a cellular network or a geographically disparate Wi-Fi network) and is used to record and check transactions in a cryptographically secure manner. The client devices 106(1)-106(N) can comprise general-purpose computers such as desktop computers or laptop computers, as well as various mobile devices that can include smartphones, personal digital assistants (PDAs), tablet computers, and/or other electronic devices executing conventional web browser applications, or applications that have been developed for a specific platform (e.g., operating system, computer system, or some combination thereof) and that are capable of receiving input, processing the input, and generating output data.

The structure of the blocks may be tamper-resistant. For instance, a block may be added to the blockchain 116 only if all of the computing nodes (i.e., client devices 106(1)-106(N)) or a subset of nodes with sufficient computation power in the network 112 implementing the blockchain 116 agree on the block. In addition, each block has a cryptographic proof-of-work embedded in it, such that past transactions cannot be altered without breaking a chain of cryptographic proofs. Because each block in the blockchain represents a transaction or a set of transactions, more proof-of-work is needed for longer chains.

Each time a transaction is recorded to the blockchain, the transaction is organized into a transaction block for addition to the blockchain. In various embodiments, several transactions are received and are organized into a single transaction block based on predefined criteria (e.g., a timeframe in which the transactions are received). It is noted that there may be multiple chains that can be traced back to a first block in the blockchain 116, depending upon embodiments. For example, the first block can refer to transactions related to at least a portion of a data file or a document. Subsequently, the data file can be duplicated to make the first set of changes to the first copy of the data file and the second set of changes to the second copy of the data file. Changes may be made to the same portion of the data file, an additional portion of the data file, or a new portion of the data file. The individual portions of the first copy of the text data file and the second copy of the data file can be signed. Thereafter, the signed transaction for the first copy of the data file can be referenced in a first blockchain, and the signed transaction for the second copy of the data file can be referenced in a second blockchain. Both the first blockchain and the second blockchain can be traced back to the first block.

The architecture 100 may further include a file editor application 102. The file editor application 102 may comprise a kit of viewers and editors for various types of data files in text format, image format, table format, or other file formats. Additionally, or alternatively, the architecture may comprise individual applications for viewing and editing text, images, videos, audio, and/or so forth. The file editor application 102 can be a native software program that resides locally in part or in whole on the one or more client devices 106(1)-106(N). Additionally, or alternatively, the file editor application 102 can be a cloud-based application or a web-based application that relies on one or more remote computing nodes such as servers. In this way, the client devices 106(1)-106(N) can execute the file editor application 102 to log onto the one or more computing nodes and create data files in various format (e.g., text format, image format, table format, etc.), which may be stored and maintained locally on the client devices 106(1)-106(N) and/or a remote database.

In some aspects, the file editor application 102 may include a text editor component. The text editor component can comprise a computer program that creates, stores, manipulates, and/or formats text files. For example, the text editor component is configured to edit text and provide features typical of a word processor such as multiple font selection, text formatting, find and replace, cut, copy, and paste, undo/redo, data transformation, filtering, syntax highlighting, extensibility (e.g., for use with plug-ins), and/or so forth. These features may be switched on and off by a user command received via an application user interface, which may comprise a graphical user interface (GUI) that can include a dashboard and/or text editing or formatting tools for display. The text editor component may support plain text, XML files, NSIS files, batch files, C Sharp files, Java files, and/or so forth. For instance, the text editor component can read and write text document files in various text format (e.g., plain text format, binary format, etc.) to open files saved from other text editor applications.

Additionally, the file editor application 102 may include an image editor component. The image editor component can comprise a computer program that creates, stores, manipulates, and/or formats image files. For example, the image editor component is configured to display and edit images and provide features typical of an image editor such as image selection, image formatting, cut, copy, and paste, undo/redo, cropping, rotating, extensibility (e.g., for use with plug-ins), and/or so forth. These features may be switched on and off by user command received via an application user interface, which may comprise a GUI that can include a dashboard and/or image editing or formatting tools for display. The image editor component may support a plain image and icon editor.

In some aspects, the file editor application 102 may include additional components for viewing and editing tables, PDF files, video files, audio files, and/or so forth. Further, the file editor application 102 can also provide a Representational State Transfer (REST)-based Application Programming Interface (API). The API enables an API user to create new data files (e.g., text files, image files, etc.) by either referencing an existing template or including an existing file in his or her API request. For the latter option, the API user can edit contents in the file that he or she includes in the API request.

The file editor application 102 comprises a parsing engine 104 for parsing a data file into one or more portions representing a binary element based at least on one or more parsing parameters (such as white spaces between characters, line breaks, page breaks, word count, boundaries, etc.). The client devices 106(1)-106(N) may have access to a database where parsing parameters can be stored. The binary element is associated with a content type based on a file format of a data file such as text in a text file. Thus, one or more portions of a text file can represent a body of text such as a paragraph. In various embodiments, the parsing engine 104 may implement a machine learning algorithm to identify and parse one or more portions of a data file.

Additionally, the file editor application 102 may further comprise a component that supports digital signing, signature verification, and/or encryption. The keys utilized for digital signing may be provided by a key server 114. In various embodiments, the distributed ledger may include both public and private data streams or channels. Private channels may be accessible only to member computing nodes that possess appropriate cryptographic keys. Thus, the key server 114 may generate cryptographic keys for one or more client devices 106(1)-106(N) that enable those client devices to view and add private blocks to the distributed ledger. The key server 114 may include general-purpose computers, such as desktop computers, tablet computers, laptop computers, servers, or other electronic devices that are capable of receiving input, processing the input, and generating output data. The key server 114 may also be virtual computing devices in the form of computing nodes, such as virtual machines and software containers.

In the illustrated embodiment, the first user 108(1) at the first client device 106(1) may create a first version of the data file 110(1) such as a text file, and a hash algorithm is applied to at least a portion of the first version of the data file 110(1) to create a unique hash value associated with the portion of the first version of the data file 110(1). Additionally, the first user 108(1) may cryptographically sign the portion in the first version of the data file 110(1) with the first user's private key and transmit the first version of the data file 110(1) to a second user 108(2). The signature can be stored separately (e.g., in a database) from the data file, depending upon embodiments. The first version of the data file 110(1) may or may not be encrypted, depending upon embodiments. For instance, an encryption component of the file editor application 102 may apply a cryptographic algorithm (e.g., Advanced Encryption Standard (AES)) to at least a portion of the data file 110(1) to at least partially obfuscate the data file 110(1).

The first user's signature can be used to authenticate the portion of the first version of the data file 110(1) and the identity of the first user 108(1). For instance, upon receiving the first version of the data file 110(1), the second user 108(2) at the second client device 106(2) can verify the first user's signature by using the first user's public key to decrypt the first user's signature and to create a first hash value and compare the first hash value to the unique hash value calculated using the hash algorithm. If the first hash value matches the unique hash value, the first user's signature is verified. If the second user 108(2) is unable to decrypt the signature using the first user's public key, the second client device 106(2) can indicate that the signature is invalid.

Additionally, or alternatively, the second user 108(2) can verify whether the portion of the first version of the data file 110(1) is authentic by processing the portion of the first version of the data file 110(1) through the same hash algorithm to create a second hash value. If the second hash value matches the unique hash value, the portion of the first version of the data file 110(1) is authentic. Further, the first hash value and the second hash value may be compared. If the first hash value matches the second hash value, the second user 108(2) at the second client device 106(2) can confirm that the portion of the first version of the data file 110(1) has not changed in transit and that the first user 108(1) is the author of the portion of the first version of the data file 110(1).

In various embodiments, two or more users (e.g., the first user 108(1) and the second user 108(2)) may have concurrent access to the same data file such as a text file. In this scenario, each user can sign a portion of the text file that he or she authors with his or her respective private key. Additionally, or alternatively, the second user 108(2) at the second client device 106(2) may create a second version of the data file 110(2). The second version of the data file 110(2) can include an updated portion and/or a new (i.e., additional) portion of the data file and a hash algorithm is applied to the updated portion and/or the new portion of the second version of the data file 110(2) to create a second unique hash value associated with the updated and/or the new portion of the second version of the data file 110(2). The hash algorithm applied to the updated portion and/or the new portion may be the same or different from the hash function applied to the portion of the first version of the data file 110(1). Additionally, the second user 108(2) may cryptographically sign the portion in the second version of the data file 110(2) with the second user's private key and transmit the second version of the data file 110(2) to a subsequent user 108(N). The second version of the data file 110(2) may or may not be encrypted, depending upon embodiments.

The subsequent user 108(N) at the subsequent client device 106(N) can verify the second user's signature by using the second user's public key to decrypt the second user's signature and to create a third hash value and compare the third hash value to the second unique hash value. If the third hash value matches the second unique hash value, the second user's signature is verified. If the subsequent user 108(N) is unable to decrypt the signature using the second user's public key, the subsequent client device 106(N) can indicate that the signature is invalid.

The subsequent user 108(N) can also verify whether the updated portion and/or the new (i.e., additional) portion of the second version of the data file 110(2) is authentic by processing the portion of the second version of the data file 110(2) through the same hash algorithm to create a fourth hash value based on the plaintext represented the updated portion. If the fourth hash value matches the second unique hash value, the portion of the second version of the data file 110(2) is authentic. Further, the third hash value and the fourth hash value may be compared. If the third hash value matches the fourth hash value, the subsequent user 108(N) at the subsequent client device 106(N) can confirm that the portion of the second version of the data file 110(2) has not changed in transit and that the second user 108(2) is the author of the updated portion of the second version of the data file 110(2). In various embodiments, the data files can be authenticated by way of any of the techniques now available in the art or which may become available (e.g., Twofish, RSA algorithm, El Gamal, Schorr signature, DSA, Pretty Good Privacy (PGP), GNU Privacy Guard (GPG or GnuPG), or other symmetric and asymmetric cryptography systems).

The signed transactions are recorded in the blockchain 116. In the illustrated embodiment, a first block can refer to a transaction related to the first version of the data file 110(1) created and signed by the first user 108(1) at the first client device 106(1). Subsequently, the second user 108(2) can make changes to the first version of the data file 110(1) to create and sign the second version of the data file 110(2) at the second client device 106(2). The signed transaction associated with the second version of the data file 110(2) can be referenced in a second block. This process continues with additional users 108(N) to create additional versions of the data file 110(N) at additional client devices 106(N).

Figure 2:
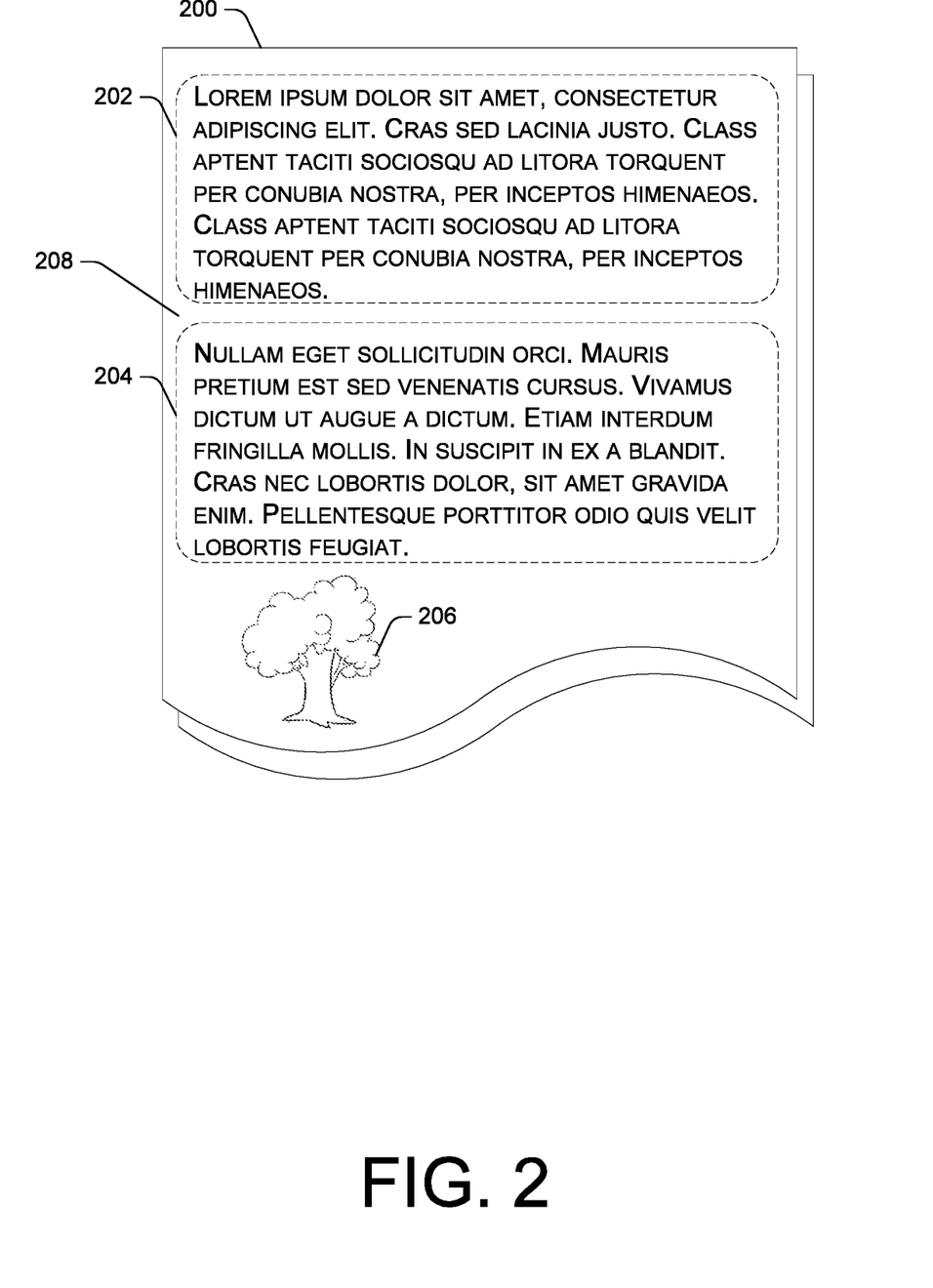
FIG. 2 illustrates an embodiment of a document representing a data file comprising text and image content.

The techniques described herein are also applicable to binary files such as image files. FIG. 2 illustrates an embodiment of a data file 200 that may be created or edited using the file editor application. In the illustrated embodiment, the data file 200 includes one or more portions comprising text and/or images. In some aspects, the data file 200 can comprise one or more portions comprising video, audio, and/or other types of content including meta-data that may be machine readable. In the illustrated embodiment, the data file 200 includes a first portion 202 comprising the first paragraph of text and a second portion 204 comprising the second paragraph of text. The data file 200 further includes a third portion 206 comprising an image. The data file 200 may also include a fourth portion comprising some meta information stored within the file itself.

Each of the portions can be parsed from the single data file 200 using a parsing engine. The parsing engine can identify and define individual portions of the data file 200 based on one or more parsing parameters. In the illustrated embodiment, the parsing engine can define the first portion 202 and the second portion 204 based on the white space 208 or the line break between the first paragraph and the second paragraph. In various embodiments, the parsing engine can define the first portion 202 and the second portion 204 based on word count. For example, one or more parsing parameters can include a word limit such that the number of words in each portion does not exceed the word limit threshold. In another example, the parsing engine can define different portions based on page breaks or section breaks.

In some aspects, the parsing engine can include an image classifier to parse graphical elements or content from data files. The image classifier is configured to identify which portions of an image represents a target item to be parsed. The classifier can identify discrete objects within an image and classify those objects by size and image values, either separately or in combination. Example image values include inertia ratio, contour area, and Red-Green-Blue and Alpha components. Based on those values, the objects are ranked and sorted. Items above a predetermined threshold or the highest N objects are selected as portions of the image representing the target item. In various embodiments, the classifier can identify a target item within an image and define a parameter around the target item to be parsed. In the illustrated embodiment, the parsing engine can parse the third portion 206 using an image classifier by identifying the target item (e.g., an image of a tree) and defining a boundary around the target item.

A hash algorithm may be applied to each of the portions 202-206 of the data file 200 to create a unique hash value associated with the individual portions 204-206 of the data file 200. If the portions 202-206 are authored by one user, the user may cryptographically sign the data file 200 with the first private key and the transaction is recorded on the blockchain. Additionally, or alternatively, multiple users may author different portions. For instance, the first portion 202 can be authored by a first user. The second portion 204 can be authored by a second user. The third portion 206 can be authored by a third user. In such a scenario, each of the first user, second user, and the third user may sign the respective portions of the data file 200.

Figure 3:
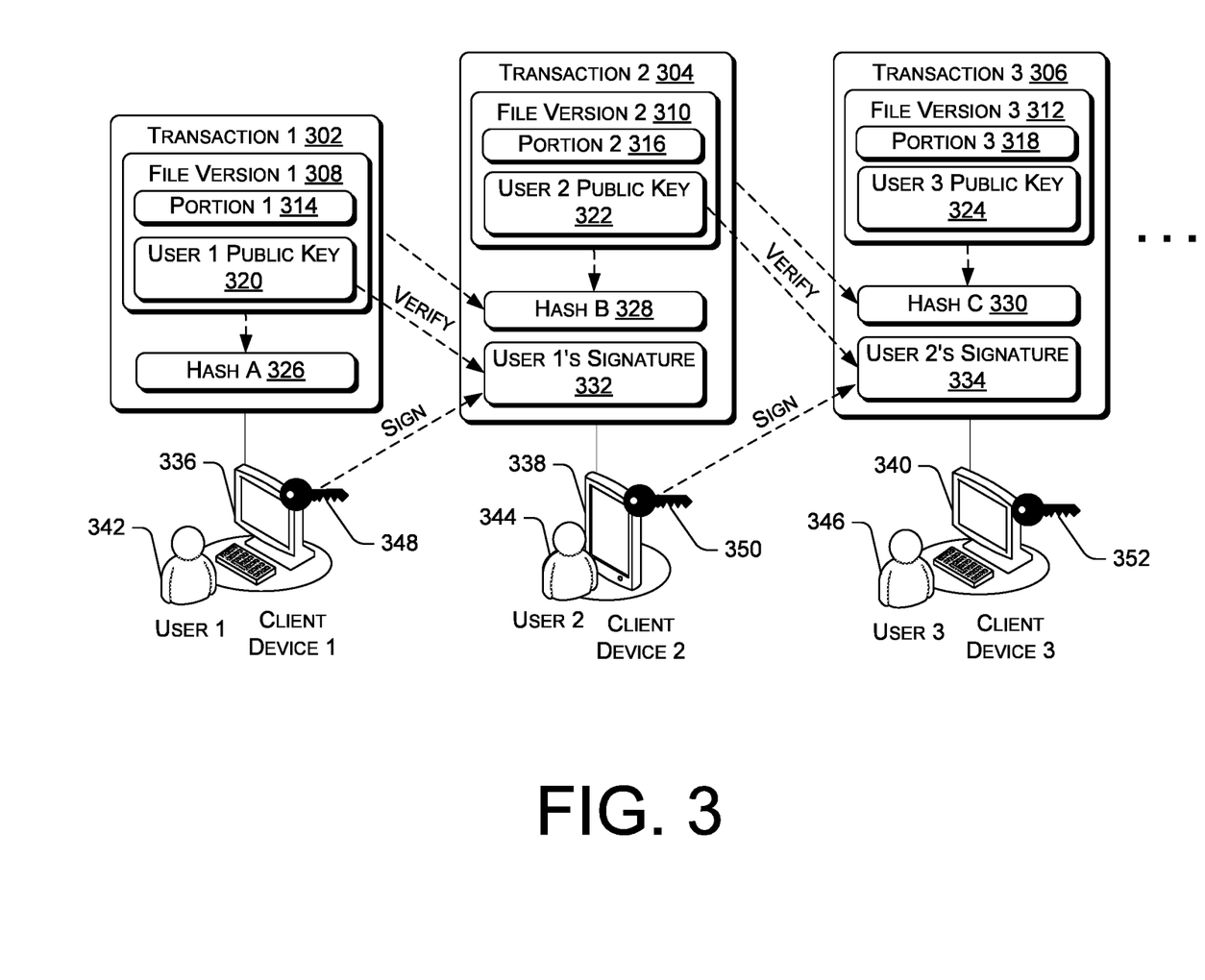
FIG. 3 is a block diagram of an example system architecture for implementing blockchain for verifying and tracking individually parsed portions of a data file.

FIG. 3 is a block diagram of an example system architecture for implementing blockchain for verifying and tracking individually parsed portions of a data file. The first user 342 at the first client device 336 creates the first version of a data file 308 using a file editor application such as a text editor application. The first user 342 may author a first portion 314 in the first version of the data file 308. A hash algorithm is applied to the first portion 314 and a hash value 326 associated with the first portion 314 is generated. The hash value 326 is signed with the first user's private key 348 using digital signature software to certify the data file and transmit it to the second user 344 at the second client device 338. This first transaction 302 is recorded onto a blockchain distributed ledger.

Subsequently, the second client device 338 may receive, from the first client device 336, the first version of the data file 308. The first user's public key 320 is used to decrypt the first user's signature 332 and the resulting hash is compared with the hash value 326 to determine whether the first user's signature 332 is valid. Additionally, the second client device 338 may process the first portion 314 through the same hash algorithm to determine whether the resulting hash is identical to the hash value 326. The resulting hash values are also compared to determine whether the first portion 314 of the first version of the data file 308 has not been changed, and that the first user 342 is the author of the first portion 314 of the first version of the data file 308.

Upon authenticating the first portion 314 of the first version of the data file 308 and verifying the first user's signature 332, the second client device 338 may create a second version of the data file 310. In the illustrated embodiment, the second version of the data file 310 may include a second portion 316, wherein the second user 344 may author the second portion 316 in the second version of the data file 310 and electronically sign the data file using the second user's private key 350 to certify the data file and transmit it to the third user 246 at the third client device 340. This second transaction 304 is recorded onto the blockchain distributed ledger.

The third client device 340 may receive, from the second client device 338, the second version of the data file 310. The second user's public key 322 is used to decrypt the second user's signature 334 and the resulting hash is compared with the hash value 328 to determine whether the second user's signature 334 is valid. Additionally, the third client device 340 may process the second portion 316 through the same hash algorithm to determine whether the resulting hash is identical to the hash value 328. The resulting hash values are also compared to determine whether the second portion 316 of the second version of the data file 310 has not been changed and that the second user 344 is the author of the second portion 316 of the second version of the data file 310.

Upon authenticating the second portion 316 of the second version of the data file 310 and verifying the second user's signature 334, the third client device 340 may create a third version of the file 312. In the illustrated embodiment, the third version of the file 312 may include a third portion 318 that is hashed and electronically signed by the third user 346 using the third user's private key 352 to certify the third version of the data file 312. This third transaction 306 is recorded onto the blockchain distributed ledger. Thereafter, subsequent users can utilize the third user's public key 324 to verify the third user's signature. Additionally, the third portion 318 can be processed through the same hash algorithm to generate a hash value that is compared to the hash value 330 associated with the third transaction 306.

In some aspects, parsed portions can be hashed in order to detect plagiarism. For instance, the first portion 314 of the first version of the data file 308 and the second portion 316 of the second version of the data file 310 can be hashed at the third client device 340 using the same hash algorithm. If the resulting hash values are the same, then the third client device 340 can determine that the content of the first portion 314 may be a copy of the second portion 316 or vice versa.

Example Computing Device Components

Figure 4:
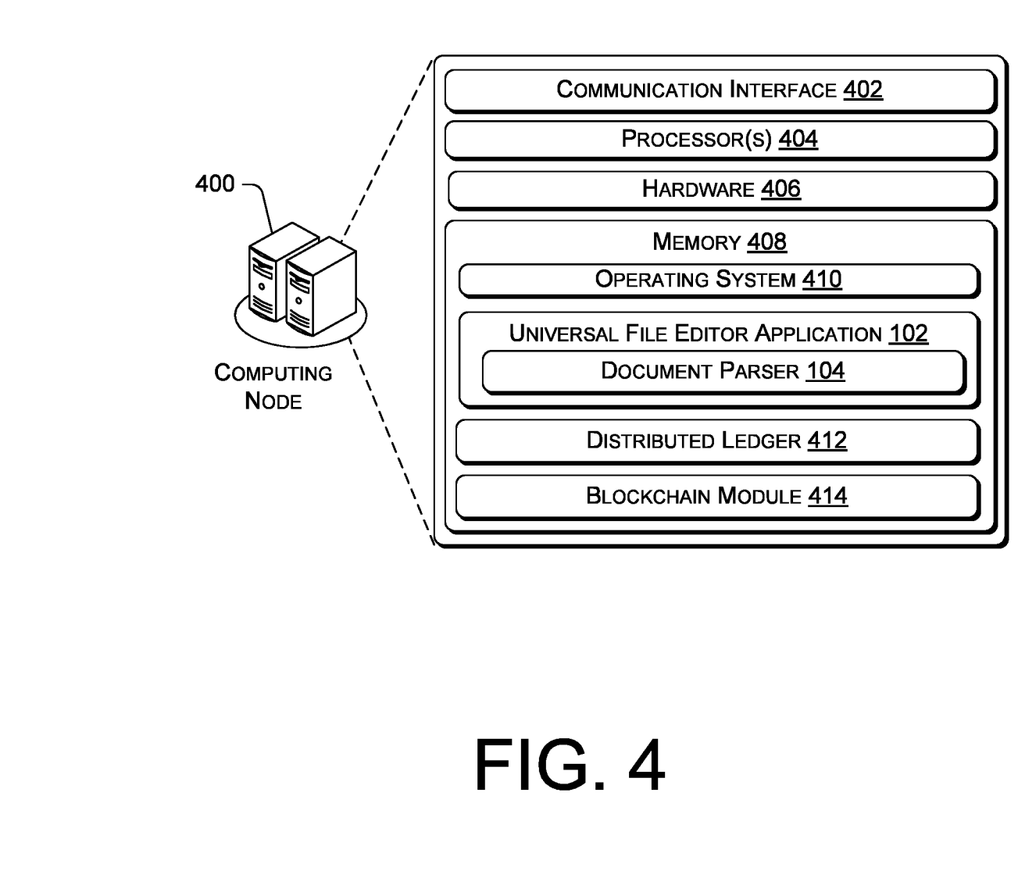
FIG. 4 is a block diagram showing various components of one or more computing devices that are configured to create and track multiple versions of a data file.

FIG. 4 is a block diagram showing various components of one or more illustrative computing devices comprising one or more computing nodes 400 that can comprise a plurality of peer computer systems that each store at least a portion of a blockchain distributed ledger. It is noted that the computing device(s) as described herein can operate with more or fewer of the components shown herein. Additionally, the computing device(s) as shown herein or portions thereof can serve as a representation of one or more of the computing devices of the present system.

The one or more computing nodes 400 may include a communication interface 402, one or more processors 404, hardware 406, and a memory unit 408. The communication interface 402 may include wireless and/or wired communication components that enable the one or more computing nodes 400 to transmit data to and receive data from other networked devices. In at least one example, the one or more processor(s) 404 may be a central processing unit(s) (CPU), graphics processing unit(s) (GPU), both a CPU and GPU or any other sort of processing unit(s). Each of the one or more processor(s) 404 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 404 may also be responsible for executing all computer applications stored in the memory, which can be associated with common types of volatile (RAM) and/or non-volatile (ROM) memory. The hardware 406 may include additional hardware interface, data communication, or data storage hardware. For example, the hardware interfaces may include a data output device (e.g., visual display, audio speakers), and one or more data input devices (e.g., keypads, keyboards, mouse devices, touch screens that accept gestures, microphones, voice or speech recognition devices, etc.).

The memory unit 408 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or another transmission mechanism. In contrast, communication media may embody computer-readable instructions, data structures, program modules, or other data in a modulated data signal, such as a carrier wave, or other transmission mechanisms. The memory 408 may also include a firewall. In some embodiments, the firewall may be implemented as hardware 406 in the computing node 400.

The processor 404 and the memory unit 408 may implement an operating system 410, a file editor application 102, distributed ledger 412, and a blockchain module 414. The operating system 410 may include components that perform various additional functions generally associated with an operating system. For example, the operating system 410 may include components that enable the one or more computing nodes 400 to receive and transmit data via various interfaces (e.g., user controls, communication interface, and/or memory input/output devices), as well as process data using the processors 404 to generate output. The operating system 410 may include a presentation component that presents the output (e.g., display the data on an electronic display, store the data in memory, transmit the data to another electronic device, etc.). The operating system 410 may also provide an execution environment for the file editor application 102, the distributed ledger 412, and the blockchain module 414.

The file editor application 102 may comprise a kit of viewers and editors that can support various types of data files and file formats. Additionally, or alternatively, the file editor application may comprise individual applications for viewing and editing text, images, videos, audio, and/or so forth. Thus, the file editor application 102 may include a text editor component, an image editor component, and/or additional components for viewing and editing tables, PDF files, video files, audio files, and/or so forth. The file editor application 102 may provide features typical of a word processor, image editor, video editor, audio editor, and/or so forth. These features may be switched on and off by user command received via an application user interface, which may comprise a GUI that can include a dashboard and/or text editing or formatting tools for display.

The file editor application 102 includes a parsing engine 104. The file editor application 102 comprises a parsing engine 104 for parsing a data file into one or more portions representing a binary element based at least on one or more parsing parameters (such as white spaces between characters, line breaks, page breaks, word count, boundaries, etc.). The computing nodes 400 may have access to a database where parsing parameters can be stored. The binary element is associated with a content type based on a file format of a data file such as text in a text file. Thus, one or more portions of a text file can represent a body of text such as a paragraph. In various embodiments, the parsing engine 104 may implement a machine learning algorithm to identify and parse one or more portions of a data file.

Additionally, the file editor application 102 may further comprise a component that supports digital signing, signature verification, and/or encryption. For instance, the file editor application 102 utilizes a digital certificate, which may be a hash function of a private key held by an author, while the author's public key, which may be distributed to one or more parties of the distributed ledger 412, may be used to authenticate that the author of the private key used in the hash function is indeed the author, thereby verifying the identity of the author. The hash function is applied to a parsed portion of a data file to generate a hash value. The file editor application 102 then applies a private key algorithm to the hash value to generate a signature.

The distributed ledger 412 is a tamper-proof shared digital ledger (e.g., a database) that records transactions or other types of data in a public or a private peer-to-peer network. The distributed ledger 412 may be distributed to all member nodes (e.g., the computing nodes 400) in the network to enable the member nodes to view transactions that are relevant to them, or in some embodiments, may view all the blocks of a distributed ledger. Each member node is its own authority, and anyone may participate in a transaction. In some embodiments, the right to participate in exchange information on a distributed ledger may be limited. The distributed ledger 412 may include one or more blocks, each associated with a respective transaction. The distributed ledger may receive a request, from the blockchain module 414 to add, delete, or update the one or more blocks.

The blockchain module 414 may be configured to maintain relationships and/or associations identifying how blocks may be related to one another, and/or the identity of various blocks (e.g., identifying what information is associated with each block). Further, the blockchain module 414 may maintain and update one or more distributed ledgers 412 (which may be stored locally or remotely, depending upon embodiments). For example, the blockchain module 414 may perform operations that update blocks, add blocks, delete blocks, validate new blocks, reject new blocks, and/or so forth.

Example Processes

Figure 5:
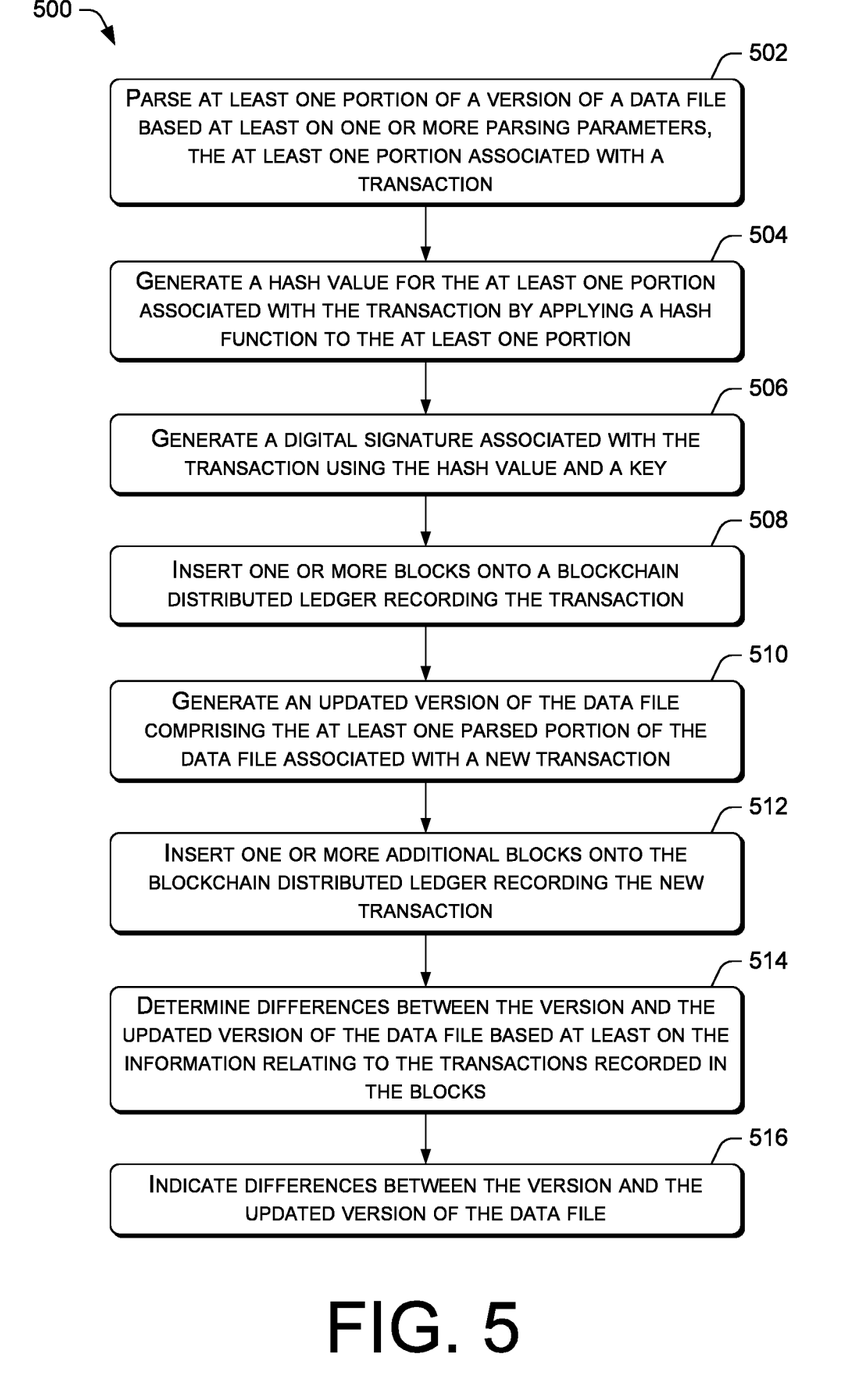
FIG. 5 is a flow diagram of an example process for implementing blockchain for verifying and tracking individually parsed portions of a data file.
Figure 6:
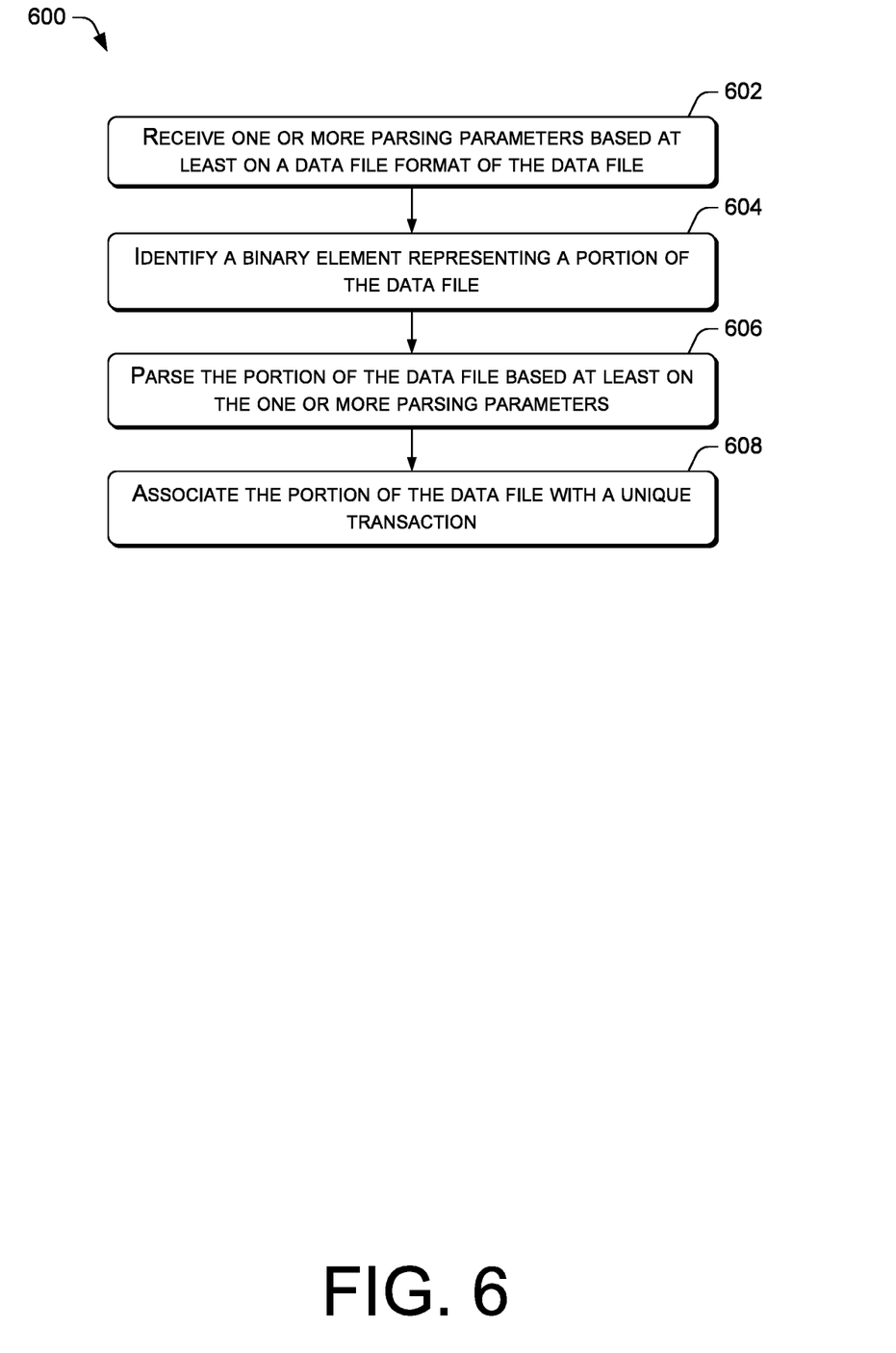
FIG. 6 is a flow diagram of an example process for parsing a data file.

FIGS. 5 and 6 present illustrative processes 500 and 600 for implementing blockchain to verify and track at least portions of a data file. Each of the processes 500 and 600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500 and 600 are generally described with reference to FIGS. 1-4.

FIG. 5 is a flow diagram of an example process 500 for implementing blockchain for verifying and tracking individually parsed portions of a data file. At block 502, a computing node of a plurality of peer computing nodes that store at least a portion of a blockchain distributed ledger parses, via a parsing engine of a file editor application, at least one portion of a data file based at least on one or more parsing parameters. The parsing parameters can depend on the data file type. In some aspects, at least one portion of the data file can comprise a body of text, an image, a segment of a video clip, or a segment of an audio clip. At block 504, the computing node generates a hash value for at least one portion associated with the transaction by applying a hash function. At block 506, the resulting hash value is cryptographically signed with a private key to generate a signature. The private key is unique and thus associated with a specific client device. At block 508, the computing node inserts one or more blocks onto a blockchain distributed ledger recording the signed transaction. If the distributed ledger comprises a private channel and the blocks comprise private blocks, the private key may enable the computing node to view and add private blocks to the distributed ledger.

At block 510, the computing node generates, via the file editor application, an updated version of the data file comprising the at least one parsed portion of the data file associated with a new transaction. The at least one parsed portion in the updated version of the data file may be the same parsed portion in the previous version of the data file. Additionally, or alternatively, the at least one parsed portion in the updated version of the data file may be different from the parsed portion in the previous version of the data file. The at least one parsed portion in the updated version of the data file is processed through a hash function and the resulting hash value is cryptographically signed with a private key. The same hash function may be applied to the at least one parsed portion in the version of the data file and the updated version of the data file. Additionally, the resulting hash value may be cryptographically signed with the same key if the same author generates both versions of the data file. Alternatively, the resulting hash value may be cryptographically signed with a different key if a different author generates the updated version of the data file. At block 512, the computing node inserts one or more additional blocks onto the blockchain distributed ledger recording the new transaction. At block 514, the computing node determines differences between the version and the updated version of the data file based at least on the information relating to the transactions recorded in the blocks. In various embodiments, the hash values of the portions associated with transactions may be compared. If the hash values are different, the version of the data file and the updated version of the data file are different. Changes made to the version of the data file can be traced back to one or more transactions based on the information stored in the blocks, and thus to one or more authors. In the illustrated embodiment, changes made to the at least one parsed portion can be traced back to the new transaction recorded in the additional blocks. At block 516, the computing node indicates differences between the version and the updated version of the data file. In some aspects, the computing node may receive a request for the provenance of the data file. In response, the computing node may present the various ownership and contribution data within the file or within the meta-information of the file. For example, the computing node may present an identity of an author of the at least one portion of the version of the data file, wherein the identity of the author associated with the key.

FIG. 6 is a flow diagram of an example process 600 for parsing a data file. At block 602, a computing node receives one or more parsing parameters based at least on a data file format of the data file. For instance, parsing parameters can be stored in a database. At block 604, the computing node identifies a binary element representing a portion of the data file. In one example, the binary element is associated with a content type based on the file format of the data file such as text in a text file. The binary element can also be associated with a plurality of content types. For instance, the binary element can comprise both text and images in a PDF file. In another example, the binary element can comprise images in an image file. At block 606, the computing device parses the portion of the data file based at least on the one or more parsing parameters. At block 608, the computing device associates the portion of the data file with a transaction. In various embodiments, a plurality of portions of the data file may be associated with the same transaction. Additionally, or alternatively, individual portions of the data file may be associated with the respective transaction.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
one or more non-transitory storage mediums configured to provide stored computer-readable instructions, the one or more non-transitory storage mediums coupled to one or more processors, the one or more processors configured to execute the computer-readable instructions to cause the one or more processors to:
parse a first version of a text file into a first textual portion and a second textual portion based at least on one or more parsing parameters, the first textual portion being associated with a first transaction;
based on the first textual portion having a first author and a second author, generate a first hash value for a first segment of the first textual portion associated with the first transaction from a hash function applied to the first segment of the first textual portion;
based on the first textual portion having the first author and the second author, generate a second hash value for a second segment of the first textual portion associated with the first transaction from the hash function applied to the second segment of the first textual portion;
generate a first digital signature associated with the first transaction using the first hash value and a first key of the first author;
generate a second digital signature associated with the first transaction using the second hash value and a second key of the second author;
in response to generating the first digital signature and the second digital signature, insert one or more blocks onto a blockchain distributed ledger recording the transaction;
receive a second version of the text file comprising an updated first textual portion and the second textual portion, the updated first textual portion being associated with a second transaction, wherein the first textual portion and the updated first textual portion include textual differences;
insert one or more additional blocks onto the blockchain distributed ledger recording the second transaction; and
indicate a difference between the first version of the text file and the second version of the text file, based at least on the first transaction recorded in the one or more blocks and the second recorded in the one or more additional blocks.

2. The system of claim 1, the one or more processors further configured to:
generate an additional hash value for the updated first textual portion of the second version of the text file associated with the new transaction from the hash function applied to the updated first textual portion; and
generate an additional signature associated with the new transaction using the additional hash value and the key.

3. The system of claim 2, the one or more processors further configured to:
determine the difference between the first version of the text file and the second version of the text file based at least on the first hash value, the second hash value, and the additional hash value.

4. One or more non-transitory computer-readable media storing computer-executable instructions that upon execution cause one or more processors to perform acts comprising:
parsing a first version of a text file into a first textual portion and a second textual portion based at least on one or more parsing parameters, the first textual portion being associated with a first transaction;

based on the first textual portion having a first author and a second author, generating a first hash value for a first segment of the first textual portion associated with the first transaction from a hash function applied to the first segment of the first textual portion;

based on the first textual portion having the first author and the second author, generating a second hash value for a second segment of the first textual portion associated with the first transaction from the hash function applied to the second segment of the first textual portion generating a first digital signature associated with the first transaction using the first hash value and a first key of the first author;

generating a second digital signature associated with the first transaction using the second hash value and a second key of the second author;

in response to generating the first digital signature and the second digital signature, inserting one or more blocks onto a blockchain distributed ledger recording the transaction;

receiving a second version of the text file comprising an updated first textual portion and the second textual portion, the updated first textual portion being associated with a second transaction, wherein the first textual portion and the updated first textual portion include textual differences;

inserting one or more additional blocks onto the blockchain distributed ledger recording the second transaction; and indicating a difference between the first version of the text file and the second version of the text file, based at least on the first transaction recorded in the one or more blocks and the second recorded in the one or more additional blocks.

5. The one or more non-transitory computer-readable media of claim 4, the acts further comprising:

generating an additional hash value for the updated first textual portion of the second version of the text file associated with the new transaction from an additional hash function applied to the updated first textual portion; and generating an additional signature associated with the new transaction using the additional hash value and an additional key.

6. The one or more non-transitory computer-readable media of claim 5, the acts further comprising:

determining the difference between the first version of the text file and the second version of the text file based at least on the first hash value, the second hash value, and the additional hash value.

7. The one or more non-transitory computer-readable media of claim 4, wherein:

the first key comprises a first private key associated with an identity of the first author, the first private key providing access to a first private channel of the blockchain distributed ledger, and the second key comprises a second private key associated with an identity of the second author, the second private key providing access to a second private channel of the blockchain distributed ledger.

8. A computer-implemented method, comprising:

parsing a first version of a text file into a first textual portion and a second textual portion based at least on one or more parsing parameters, the first textual portion being associated with a first transaction;

based on the first textual portion having a first author and a second author, generating a first hash value for a first segment of the first textual portion associated with the first transaction from a hash function applied to the first segment of the first textual portion;

based on the first textual portion having the first author and the second author, generating a second hash value for a second segment of the first textual portion associated with the first transaction from the hash function applied to the second segment of the first textual portion generating a first digital signature associated with the first transaction using the first hash value and a first key of the first author;

generating a second digital signature associated with the first transaction using the second hash value and a second key of the second author;

in response to generating the first digital signature and the second digital signature, inserting one or more blocks onto a blockchain distributed ledger recording the transaction;

receiving a second version of the text file comprising an updated first textual portion and the second textual portion, the updated first textual portion being associated with a second transaction, wherein the first textual portion and the updated first textual portion include textual differences;

inserting one or more additional blocks onto the blockchain distributed ledger recording the second transaction; and indicating a difference between the first version of the text file and the second version of the text file, based at least on the first transaction recorded in the one or more blocks and the second recorded in the one or more additional blocks.

9. The computer-implemented method of claim 8, further comprising:

generating an additional hash value for the updated first textual portion of the second version of the text file associated with the new transaction from an additional hash function applied to the updated first textual portion; and generating an additional signature associated with the new transaction using the additional hash value and an additional key.

10. The computer-implemented method of claim 8, further comprising:

generating a third hash value for a third segment of the first textual portion of the text file associated with the transaction from the hash function applied to the third segment of the first textual portion;

generating a third digital signature associated with the transaction using the third hash value and a third key;

generating a fourth hash value for a fourth segment of the updated first textual portion of the second version of the text file associated with the new transaction from the hash function applied to the fourth segment of the updated first textual portion; and generating an additional digital signature associated with the new transaction using the fourth hash value and a fourth key.

11. The computer-implemented method of claim 8, wherein the one or more blocks comprise private blocks.

12. The computer-implemented method of claim 8, wherein the one or more parsing parameters are based at least on a text file format of the text file.

13. The computer-implemented method of claim 8, further comprising:
   validating the first digital signature and the second digital signature based at least on public keys associated with the first key and the second key.

14. The computer-implemented method of claim 8, further comprising:
   authenticating the first textual portion of the text file based at least on the first hash value for the first segment of the first textual portion from the hash function applied to the first segment of the first textual portion and on the second hash value for the second segment of the first textual portion from the hash function applied to the second segment of the first textual portion.

\* \* \* \* \*